(12) United States Patent
Ozawa

(10) Patent No.: US 8,596,721 B2
(45) Date of Patent: Dec. 3, 2013

(54) VEHICLE SEAT

(75) Inventor: Hitoshi Ozawa, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 422 days.

(21) Appl. No.: 13/029,904

(22) Filed: Feb. 17, 2011

(65) Prior Publication Data

US 2012/0212015 A1 Aug. 23, 2012

(51) Int. Cl.
*A47C 1/023* (2006.01)
*F16M 13/00* (2006.01)

(52) U.S. Cl.
USPC .................. 297/344.15; 248/421; 248/422

(58) Field of Classification Search
USPC ............... 297/344.15; 248/421, 422
See application file for complete search history.

(56) References Cited

U.S. PATENT DOCUMENTS

| | | | |
|---|---|---|---|
| 6,290,198 B1 * | 9/2001 | Kojima et al. | 248/421 |
| 7,066,540 B2 * | 6/2006 | Minai et al. | 297/344.15 |
| 7,360,832 B2 | 4/2008 | Yokota et al. | |
| 7,517,020 B2 * | 4/2009 | Yokota | 297/344.15 X |
| 7,828,384 B2 * | 11/2010 | Shinozaki | 297/344.15 |
| 7,984,950 B2 * | 7/2011 | Hoshi et al. | 297/344.15 |

FOREIGN PATENT DOCUMENTS

JP 7132767 A 5/1995

* cited by examiner

*Primary Examiner* — Anthony D Barfield
(74) *Attorney, Agent, or Firm* — Browdy and Neimark, PLLC

(57) ABSTRACT

In a vehicle seat, two front and two rear links are pivotally connected between a seat cushion frame and a floor of vehicle. Each of the two front links has an arcuate gear region meshed with a corresponding pinion provided to the seat cushion at a point backwardly of that arcuate gear region. Two connecting links are pivotally connected between the respective two front and rear links, such that forward pivot points respective of the two connecting links in the respective two front links are always maintained forwardly of the respective pinions, irrespective of vertical rotation of the two front links. In the case of rear-end collision, such link arrangement allows an excessive backward and downward load to be transmitted through the two connecting links and front links to the two lateral sides of seat cushion frame and dispersed therein, thereby absorbing a corresponding excessive impact.

4 Claims, 2 Drawing Sheets

VEHICLE SEAT

BACKGROUND OF THE INVENTION

1. Field of the Invention

The present invention relates to a vehicle seat, and in particular, the invention is directed to a vehicle seat including front and rear links which are vertically movable to allow for adjustment in height of seats, the seat being so arranged as to absorb an excessive great impact to be caused therein in the case of rear-end collision.

2. Description of Prior Art

In general, a rear-end collision may be defined to be one of the following two cases: a case where a vehicle collides against a rear side of another vehicle running ahead thereof; and a case where a vehicle running backwards collides at the rear side thereof against another vehicle or something hard. In any of such rear-end collisions, an upper body portion of seat occupant on a seat of the vehicle is abruptly and quickly displaced under inertia to a seat back of the seat, with an excessive great load being applied from the seat occupant to the seat back. This means that an excessive great impact is directly given to the seat back and further imparted to a seat cushion of the seat.

Suppose now that the rear-end collision occurs to a vehicle seat having a seat cushion frame very rigid in the entirety thereof enough to withstand the foregoing excessive great impact. In that case, it is highly possible for the excessive great impact to be intensively imparted to a relatively brittle mechanical part or mechanisms, such as a reclining device. Considering such defective aspect, as commonly done in the art, a deformable area is defined in a predetermined point in either the seat cushion frame or the seat back frame, so that, upon the excessive great impact being imparted to the seat cushion frame, the deformable area is quickly deformed to absorb the excessive great impact, thereby avoiding excessive stress intensively caused in the reclining device or other brittle mechanisms.

Examples of the foregoing impact absorption arrangement include: an impact absorption arrangement in a lateral frame member of seat back frame, as disclosed in the Japanese Laid-Open Patent Publication No. 7-132767 or JP 7-132767 A; and an impact absorption arrangement in a lateral fame member of seat cushion frame, as disclosed in the U.S. Pat. No. 7,360,832.

According to the JP 7-132767, predetermined localized areas in the lateral frame member of seat back frame are so formed to have deformable regions of a wavy cross-section, so that, in the case of rear-end collision, such wavy deformable regions, upon receiving an excessive great load, are buckled or collapsed to absorb a corresponding excessive great impact. On the other hand, the U.S. Pat. No. 7,360,832 teaches a rectangular or closed cross-section configuration of seat cushion frame's lateral frame member and an opened cross-section area defined in that closed cross-section structure, so that, upon an excessive great load being applied to the seat in the case of rear-end collision, a localized wall region of the seat cushion frame's lateral frame member at such opened cross-section area is deformed to thereby absorb a corresponding excessive great impact.

However, the foregoing conventional impact absorption arrangements are not simple in structure and thus require processes forming the complicated deformable areas as well as the peripheral areas around the deformable areas, which in turn requires troublesome designs and adjustments to determine a proper deformabiltiy of the deformable areas and also increases costs involved.

SUMMARY OF THE INVENTION

In view of the above-stated drawbacks, it is a purpose of the present invention to provide an improved vehicle seat which is of a simplified structure effective for absorbing an excessive great impact in the case of rear-end collision.

In order to achieve such purpose, a vehicle seat in accordance with the present invention is basically comprised of;

a seat cushion frame including a first lateral frame member and a second lateral frame member, wherein said first lateral frame member has a forward portion facing forwardly of the vehicle and a backward portion facing backwardly of the vehicle, whereas said second lateral frame member has a forward portion facing forwardly of the vehicle and a backward portion facing backwardly of the vehicle, a drive pinion rotatably provided to said first lateral frame member, said drive pinion being operatively connected with a drive source;

a first front link element so formed to have: a lower end portion pivotally secured on said floor of vehicle; and an upper portion including: a pivotal connection point pivoally connected with said forward portion of said first lateral frame member; and a widened upper area having an arcuate gear region defined therein, said arcuate gear region being in a meshed engagement with said drive pinion and so arranged as to face backwardly of the seat;

said drive pinion being disposed backward of said first front link element;

a second front link element having: an upper portion including a pivotal connection point pivotally connected with said forward portion of said second lateral frame member; and a lower end portion pivotally secured on said floor of vehicle;

a first rear link element having: an upper end portion pivotally connected with said backward portion of said first lateral frame member; and a lower end portion pivotally secured on said floor of vehicle;

a second rear link element having: an upper end portion pivotally connected with said backward portion of said second lateral frame member; and a lower end portion pivotally secured on said floor of vehicle;

a first connecting link element which is at the forward end portion thereof pivotally connected with said upper portion of said first front link element, while being at the backward end portion thereof pivotally connected with said upper end portion of said first rear link element; and a second connecting link element which is at the forward end portion thereof pivotally connected with said upper portion of said second front link element, while being at the backward end portion thereof pivotally connected with said upper end portion of said second rear link element, wherein operation of said drive source causes rotation of said drive pinion, which in turn causes vertical rotative displacement of said first and second front link elements as well as of said first and second rear link elements, thereby raising and lowering the vehicle seat, and wherein said forward end portion of said first connecting link element and said first front link element are arranged such that, even during said vertical rotative displacement of said first front link element, a pivotal connection point where said forward end portion of said first connecting link element is pivotally connected with said upper portion of said first front link element is maintained forwardly of a meshed engagement point where said drive pinion is in meshed engagement with said arcuate gear region of said first front link element.

Preferably, a free-to-rotate pinion may be rotatably provided to said second lateral frame member, and said second front link element may have a widened area defined in the upper portion thereof and an arcuate gear region defined in said widened area, said arcuate gear region being in a meshed engagement with said free-to-rotate pinion and so arranged as to face backwardly of the seat. The free-to-rotate pinion be disposed backward of said arcuate gear region of said second front link element, while being in meshed engagement therewith, The forward end portion of said second connecting link element and said second front link element are arranged such that, even during said vertical rotations of said second front link element, a pivotal connection point where said forward end portion of said second connecting link element is pivotally connected with said upper portion of said second front link element is maintained forwardly of a meshed engagement point where said free-to-rotate pinion is in meshed engagement with said arcuate gear region of said second front link element.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 1 to 4, there is illustrated a preferred embodiment of vehicle seat generally designated by (S) in accordance with the present invention, which is provided with a seat lifter mechanism (not designated) for adjustment in height of the seat.

As shown, the seat (S) is comprised of a seat cushion (SC) and a seat back (SB) rotatably connected with the seat cushion (SC), with a reclining device (not shown) operatively provided at a joint point between the seat cushion and seat back (SC) (SB) to allow the seat back (SB) to be adjustably inclined forwardly and backwardly relative to the seat cushion (SC), as known in the art.

Figure 1:
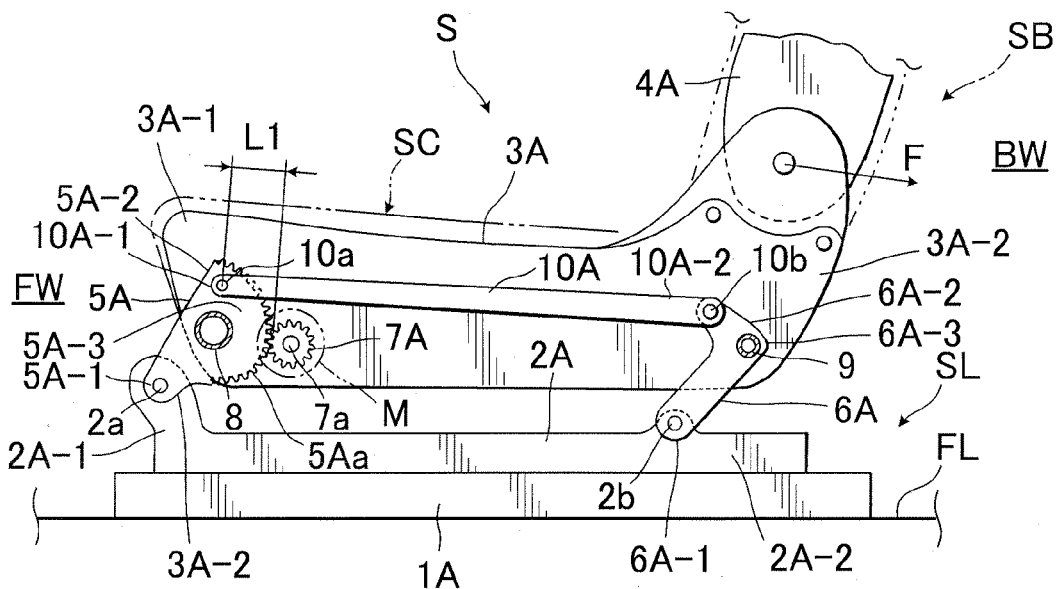
FIG. 1 is a side view showing a left side of vehicle seat and also a left-side seat framework of the vehicle seat in accordance with the present invention, which explanatorily depicts the mechanical conditions of the vehicle seat positioned at a relatively high level.
Figure 3:
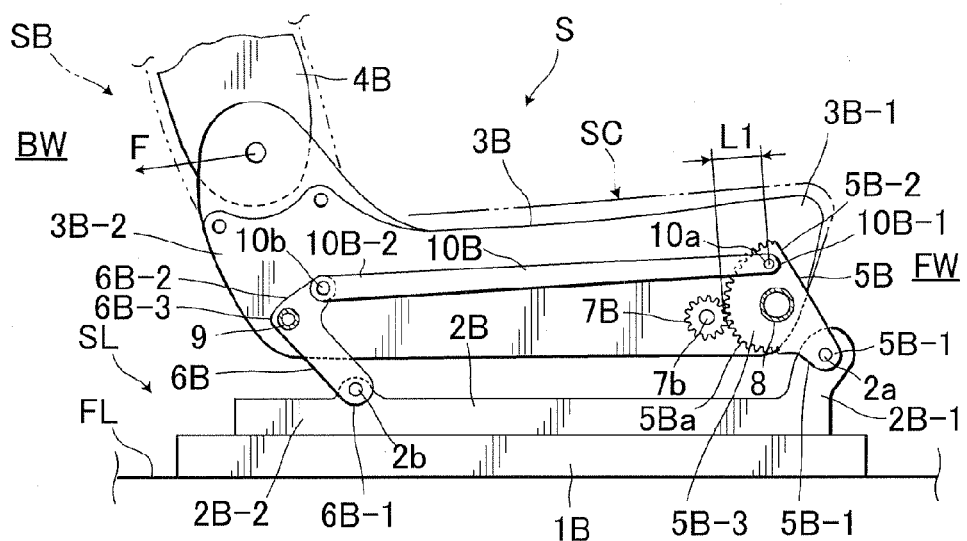
FIG. 3 is a side view showing a right side of the vehicle seat and also a right-side seat framework of the vehicle seat.

Taking a comparative view between FIG. 1 and FIG. 3, it is to be understood that a pair of left- and right-side lateral frame members (3A) and (3B) are one of the constituent elements of a seat cushion frame (not designated) provided in the seat cushion (SC), whereas a pair of left- and right-side lateral frame members (4A) and (4B) are one of the constituent elements of a seat back frame (not designated) provided in the seat back (SB), as commonly known in the art.

While not shown, as required, a front cross frame member may be fixedly connected between the two forward end portions of the left- and right-side lateral frame members (3A) (3B), and a rear cross frame member be fixedly connected between the two backward end portions respectively of the left- and right-side lateral frame members (3A) (3B), as known in ordinary seat cushion framework.

Of course, an upholstery, which includes a trim cover assembly and a foam padding, is properly attached over the above-described seat cushion frame to form the seat cushion (SC), and likewise, such upholstery is also properly attached over the above-described seat back frame to form the seat back (SB).

It is to be noted that the wording "forward" or "forwardly" refers to a forward side (FW) facing forwardly of the seat (S), whereas the wording "backward" or "backwardly" refers to a backward side (BW) facing backwardly of the seat (S).

Designation (SL) denotes a seat slide device provided between the left- and right-side lateral frame members (3A) (3B) and the floor (FL) for adjustment in position of the seat (S) in forward and backward directions. As shown, the seat slide device (SL) typically comprises a pair of left-side upper and lower rails (2A) and (1A) and a pair of right-side upper and lower rails (2B) and (1B). In any of the left and right-side rails, the upper rails (2A) (2B) are slidably engaged with the respective lower rails (1A) (1B) fixed on the floor (FL), as known in the art.

Figure 2:
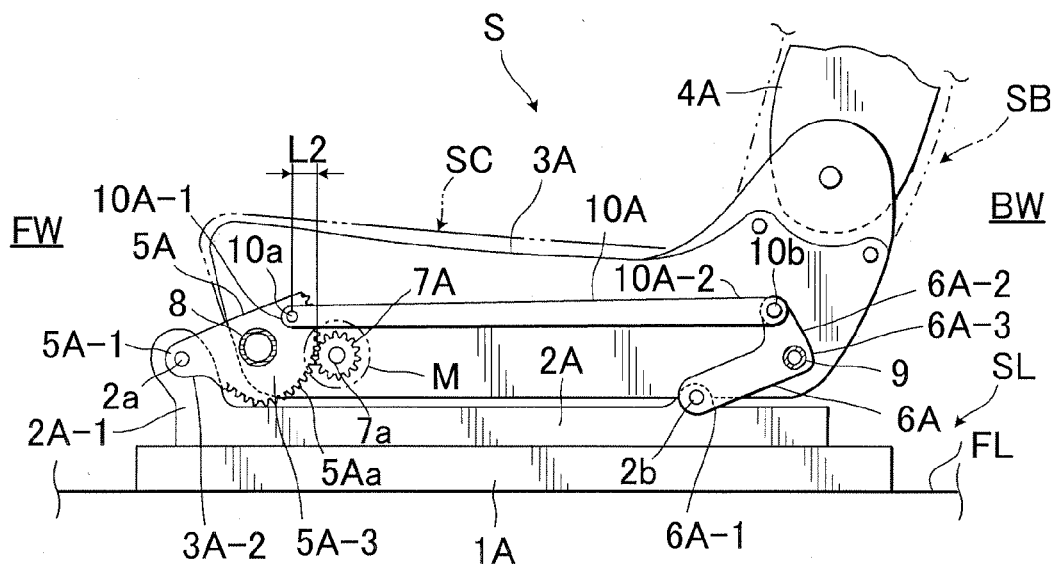
FIG. 2 is a side view of the left side of vehicle seat, which shows deformation of a left-side rear link, which explanatorily depicts the mechanical conditions of the vehicle seat lowered to a lower limit level.
Figure 4:
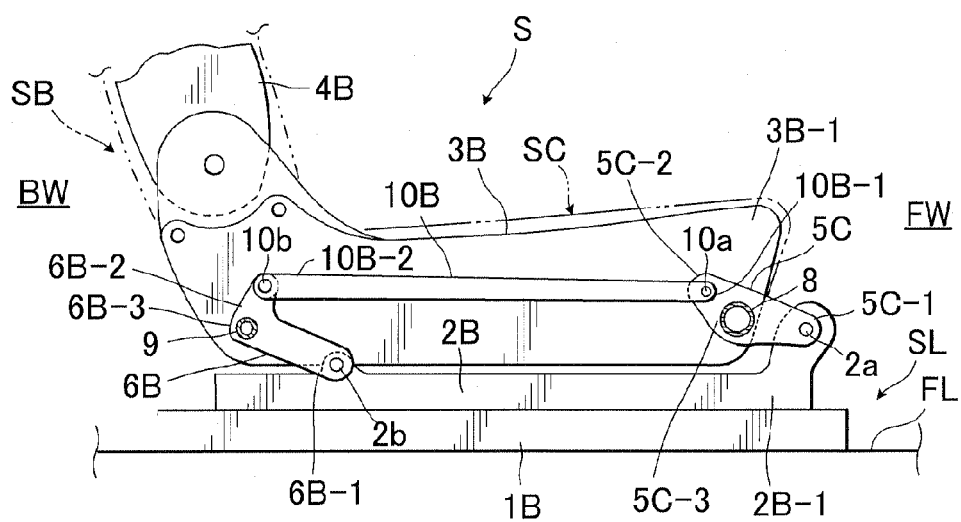
FIG. 4 is a side view of another alternative embodiment as viewed from the right side of the vehicle seat and seat framework.

FIGS. 1 and 2 depict a left side of the seat (S), from which it is to be understood that there are shown an inward surface of the left-side lateral frame member (3A) and inward sides of the left-side upper and lower rails (2A) (1A), and that both of those inward surface and inward sides naturally face inwardly of the seat (S). On the other hand, FIGS. 3 and 4 depict a right side of the seat (S), from which it is to be understood that there are shown an inward surface of right-side lateral frame member (3B) and inward sides of the right-side upper and lower rails (2B) (1B) and that both of those inward surface and inward sides naturally face inwardly of the seat (S).

In this connection, the left- and right-side lateral frame members (3A) (3B) are spaced apart from each other, with the two inward surfaces respectively of those two lateral frame members (3A) (3B) being in an opposingly faced relation with each other.

Now, on the understanding of the foregoing illustration in the drawings, a description will be made of the vehicle seat (S) of the present invention in further details.

As stated earlier, the seat (S) is provided with a seat lifter mechanism which is not designated in the Figures. In accordance with the present invention, as one of the constituent parts of such seat lifter mechanism, there are provided: a pair of left- and right-side front links (5A) and (5B), each being of a substantially semi-circular shape; and a pair of left- and right-side rear links (6A) and (6B), each being of a substantially dogleg or "L" shape. Basically, those four links (5A, 5B, 6A and 6B) are arranged in a vertically movable manner between the seat cushion (SC) and seat slide device (SL) (or a floor of vehicle designated by FL) in a parallel linkage fashion, as found in the art, such that the two front links (5A) (5B) are maintained in a parallel relation with the respective two rear links (6A) (6B), whenever those all four links are pivotally articulated vertically in synchronized way.

It is noted here that the seat slide device (SL) itself may not be used, in which case, all lower end portions of the aforementioned four links (5A, 5B 6A and 6B) may be directly or indirectly connected to the floor (FL) in an appropriate manner, using a suitable means.

Further, briefly stated, as a drive source for actuating the seat liter mechanism, a motor (M) is provided only on the side of the left lateral frame member (3A). The motor (M) has an output shaft fixed to a drive pinion (7A), the details of which will be explained later.

Specifically, according to the shown embodiment, as seen in FIG. 1, the left-side front link (5A) is so formed to have: a lower end portion (5A-1) pivotally connected via a pin (2a) with a forward end portion (2A-1) of the left-side upper rail (2A); and an upper portion defined above that lower end portion (5A-1), the upper portion including: an upper end area (5A-2); and a substantially semi-circular upper area (5A-3) having an arcuate gear region (5Aa) formed in the peripheral end thereof, wherein the acurate gear region (5Aa) faces backwardly of the seat (S).

On the other hand, as seen in FIG. 3, the right-side front link (5B) is so formed to have: a lower end portion (5B-1) pivotally connected via a pin (2a) with a forward end portion (2B-1) of the right-side upper rail (2B); an upper portion defined above that lower end portion (5B-1), the upper portion including: an upper end area (5B-2); and a substantially semi-circular upper area (5B-3) having an arcuate gear region (5Ba) formed in the peripheral end thereof, wherein the arcuate gear region (5Ba) faces backwardly of the seat (S).

The two substantially semi-circular upper areas (5A-3) and (5B-3) respectively of the left- and right-side front links (5A) and (5B) are connected, via a front connecting shaft (8), with the left- and right-side lateral frame members (3A) and (3B), respectively, in a rotatable manner. In this respect, more specifically stated, the front connecting shaft (8) is of a tubular configuration having a hollow therein, and as understandable from the hatched cross-section thereof and by comparatively looking at the FIGS. 1 and 3, it is to be seen that the front connecting shaft (8) itself is extended horizontally between the left- and right-side lateral frame members (3A) (3B). While not clearly shown, the front connecting shaft (8) are at the left- and right-side ends thereof rotatably secured in the respective two forward end portions (3A-1) and (3B-1) of the left- and right-side lateral frame members (3A) and (3B).

Thus, the front connecting shaft (8) is free to rotate between the two lateral frame members (3A) (3B). Welded respectively fast on and about the left- and right-side end portions of that front connecting shaft (8) are the previously mentioned left- and right-side front link's semi-circular upper areas (5A-3) and (5B-3). Accordingly, it is to be seen that the left- and right-side front links (5A) (5B) are pivotally connected via the free-to-rotate front connecting link (8) with the left- and right-side lateral frame members (3A) (3B), respectively, so that both two upper portions respectively of the left- and right-side front links (5A) (5B) are rotatable together synchronously relative to a central axis of that front connecting shaft (8).

It is noted that both two arcuate gear regions (5Aa) (5Ba) respectively of the left- and right-side front links (5A) (5B) extend along the circumference of a circle having its center at that central axis of front connecting shaft (8).

As seen in FIG. 1, the left-side substantially L-shaped rear link (6A) has: a lower end portion (6A-1) pivotally connected via a pin (2b) with a backward end portion (2A-1) of the left-side upper rail (2A); and an upper portion defined above that lower end portion (6A-1), the upper portion including: an angled upper area (6A-3); and an upper end area (6A-2). On the other hand, as seen in FIG. 3, the right-side substantially L-shaped rear link (6B) has: a lower end portion (6B-1) pivotally connected via a pin (2b) with a backward end portion (2B-1) of the right-side upper rail (2B); and an upper portion defined above that lower end portion (6A-1), the upper portion including: an angled upper area (6B-3); and an upper end area (6B-2).

In brief, the left-side substantially L-shaped rear link (6A) is at the angled upper area (6A-3) thereof rotatably connected, via a rear connecting shaft (9), with a backward end portion (3A-2) of the left-side lateral frame member (3A), whereas on the other hand, the right-side substantially L-shaped rear link (6B) is at the angled upper area (6B-3) thereof pivotally connected, via the rear connecting shaft (9), with a backward end portion (3B-2) of the right-side lateral frame member (3B).

Likewise as in the front connecting rod (8), the rear connecting shaft (9) is also of a tubular configuration having a hollow therein, and as understandable from the hatched cross-section thereof with a comparative reference to FIGS. 1 and 3, it is to be seen that the rear connecting shaft (9) itself is extended horizontally between the left- and right-side lateral frame members (3A) (3B) so as to be in parallel with the front connecting shaft (8). More specifically, though not clearly shown, the rear connecting shaft (9) are at the left- and right-side ends thereof rotatably secured in the respective two backward end portions (3A-2) and (3B-2) of left- and right-side lateral frame members (3A) and (3B). And, welded respectively fast on and about the left- and right-side end portions of that connecting shaft (9) are the previously mentioned left- and right-side rear link's angled upper areas (6A-3) (6B-3). Accordingly, it is to be seen that the left- and right-side rear links (6A) (6B) are pivotally connected via the free-to-rotate rear connecting link (9) with the left- and right-side lateral frame members (3A) (3B), respectively, so that both two upper portions respectively of the left- and right-side front links (5A) (5B) are rotatable together synchronously relative to a central axis of that front connecting shaft (8).

Designation (7A) in FIG. 1 denotes a drive pinion gear which is in a meshed engagement with the previously mentioned arcuate gear region (5Aa) of the left-side front link (5A). This drive pinion (7A) is shown in the FIG. 1 as being fixed to a drive shaft (7a) of the motor (M) disposed on the side of left lateral frame member (3A) and being disposed backwardly of the left-side front link (5A).

While not shown, the motor (M) is electrically connected with a switch and provided with a brake unit or reduction gear, as normally known in the art. Namely, by operating the switch, the motor (M) works to rotate the drive pinion (7A) in either of normal and reverse directions, and by turning off the switch, the motor (M) is stopped and the drive shat (7a) thereof is locked by the brake unit or reduction gear against rotation.

Designation (7B) in FIG. 3 denotes a free-to-rotate pinion fixed to a rotating pin (7b). The rotating pin (7b) is rotatably connected with the right-side lateral frame member (3B), and therefore the pinion (7B) is free to rotate at the right-side lateral frame member (3B). As shown in the FIG. 3, such free-to-rotate pinion (7B) is disposed backwardly of the right-side front link (5B) and meshed with the arcuate gear region (5Ba) of that front link (5B).

In accordance with the present invention, as can be seen from FIGS. 1 and 3, a left-side connecting link (10A) is provided between the left-side front and rear links (5A) (6A), whereas a right-side connecting link (10B) provided between the right-side front and rear links (5B) (6B), which serves to absorb an excessive great impact in the case of rear-end collision, as will be elaborated later.

Referring to FIG. 1, it is observed that the left-side connecting link (10A) is at the forward end portion (10A-1) thereof pivotally connected with the upper end area (5A-2) of the left-side front link (5A) via a pin (10a), while being at the backward end portion (10A-2) thereof pivotally connected with the upper end area (6A-2) of the left-side rear link (6A).

On the other hand, as observed in FIG. 3, the right-side connecting link (10B) is at the forward end portion (10B-1) thereof pivotally connected with the upper end are (5B-2) of the right-side front link (5B) via a pin (10a), while being at the backward end portion (10B-2) thereof pivotally connected with the upper end area (6B-2) of the right-side rear link (6B).

As constructed above, in brief, upon operation of the motor (M), the drive pinion (7A) meshed with the arcuate gear region (5Aa) of left-side front link (5A) is rotated, whereby both two upper portions respectively of the two front links (5A)(5B) are rotatively displaced in vertical direction relative to the respective two pins (2a) in synchronized way via the front connecting shaft (8). Simultaneous therewith, both two upper portions respectively of the two rear links (6A)(6B) are rotatively displaced in vertical direction relative to the respective two pins (2b) in synchronized way via the rear connecting shaft (9). In that manner, a seat occupant can control the motor (M) by operating a switch or the like (not shown) to adjustingly raise and lower the seat (S) to a desired level. When the seat occupant stops the motor (M) by turning off the switch, all the four links (5A, 5B, 6A and 6B) are stopped at a given angle of inclination relative to the slide device (SL) or the floor (FL) and retained against movement due to the meshed engagement of the two pinions (7A)(7B) with the respective two arcuate gear regions (5Aa)(5Ba), so that the seat occupant can set the seat (S) at a desired level. In this regard, of course, a brake unit (not shown) normally provided to the motor (M) works to insure locking those four links against movement.

In accordance with the present invention, it is most important to appreciate that the afore-said known two connecting links (10A)(10B) are simply arranged in the known movable front and rear link structure (5A,5B,6A and 6B) which uses a drive pinion (at 7A), in a special simple manner to be described below, for the purpose of absorbing an excessive great impact caused by an excessive great load (L) in the case of rear-end collision.

Namely, as seen in FIG. 1, the forward end portion (10A-1) of the left-side connecting link (10A) is pivotally connected via the pin (10a) with the upper end portion (5A-2) of the left-side front link (5A) at a point between the arucate gear region (5Aa) of that front link (5A) and the front connecting shaft (8), Likewise, as seen in FIG. 3, the forward end portion (10B-1) of the right-side connecting link (10B) is pivotally connected via the pin (10a) with the upper end portion (5B-2) of the right-side front link (5B) at a point between the arucate gear region (5Aa) of that front link (5A) and the front connecting shaft (8). With such arrangement, even during vertical rotation of the two front links (5A)(5B), both two end portions (10A-1)(10B-1) respective of the two connecting links (10A)(10B) are maintained at a point forwardly of and distant from the respective two pinions (7A)(7B).

In other words, as indicated by one designation (L1) in FIG. 1 and the other designation (L2) in FIG. 2, when both two front links (10A)(10B) are rotated clockwise or downwardly relative to the respective two pins (2a)(2a), it is seen that a pivot point (at 10a) where the left-side connecting link's forward end portion (10A-1) is pivotally connected via the pin (10a) with the left-side front link's upper end portion (5A-2) is always maintained at a location forward of and distant from a meshed engagement point between the left-side drive pinion (7A) and the left-side front link's arcuate gear region (5Aa), whereas the other pivot point (at 10a) where the right-side connecting link's forward end portion (10B-1) is pivotally connected via the pin (10a) with the right-side front link's upper end portion (5B-2) is always maintained at a location forward of and distant from a meshed engagement point between the right-side free-to-rotate pinion (7B) and the right-side front link's arcuate gear region (5Ba).

Further, it is seen that, as in FIG. 2, even when the seat (S) is lowered to a lower limit level, the afore-said pivoted point associated with the left-side connecting link (10A) is maintained at a position above the central axis (at 7a) of the drive pinion (7A). The same goes for the afore-said other pivoted point associated with the right-side connecting link (10B), as understandable by locking at FIGS. 1 to 3.

By virtue of the construction described above, when a rear-end collision occurs, an excessive great load (F) is applied to the seat (S) from an upper body portion of seat occupant (not shown) which is abruptly displaced backwardly and downwardly under inertia to the seat (S). In that case, the excessive great load (F) proceeds backwardly and downwardly as indicated by the arrows in FIGS. 1 and 3, and intensively exerted upon the rear end portions of the seat (S), i.e., the joint point between the seat back (SB) and seat cushion (SC) as well as the two rear links (6A)(5B). At that moment, however, most of the load (F) is quickly transmitted though the two connecting links (10A)(10B) to the two front links (10A)(10B) and dispersed in both two substantially semi-circular upper areas (5A-3)(5B-3) respectively of the left- and right-side front links (5A)(5B).

At this point, a specific explanation will be given as to how the backward and downward excessive great load (F) is to be absorbed dynamically.

A downward component of the load (F) is first dispersed equally in each of the foregoing two semi-circular upper areas (5A-3)(5B-3) and reduced to a certain degree, owing to the above-discussed location of the pivot points (at 10a) above the pinions (7A)(7B), and then, most of the thus-reduced downward component of the load (F) is imparted to the front connecting shaft (8), with a relatively small amount thereof being imparted to the two pinions (7A)(7B). Immediately thereafter, the downward component of load (F) is transmitted through those connecting shaft (8) and two pinions (7A)(7B) equally to each of the left- and right-side lateral frame members (3A)(3B) and thus equally dispersed therein.

On the other hand, simultaneous with the foregoing dispersion of downward component of the load (F), a backward component of the load (F) is also first dispersed equally in each of the foregoing two semi-circular upper areas (5A-3)(5B-3) and reduced to a certain degree, owing to the above-discussed location of the pivot points (at 10a) above the pinions (7A)(7B), and then, most of the thus-reduced backward component of the load (F) is imparted to the front connecting shaft (8), with a relatively small amount thereof being imparted to the two pinions (7A)(7B). Immediately thereafter, the backward component of load (F) is transmitted through the connecting shaft (8) and two pinions (7A)(7B) equally to each of the left- and right-side lateral frame members (3A)(3B) and thus equally dispersed therein.

Consequently, the excessive great load (F) is dispersed in both of the left- and right-side lateral frame members (3A)(3B) through the two connecting links (10A)(10B), thereby absorbing a corresponding excessive great impact, which insures to prevent both two rear links (6A)(6B) against deformation or backward inclination in the case of rear-end collision. Hence, the seat (S) is not lowered in any direction due to the rear-end collision and maintained at a normally required level. In this regard, if the excessive great load (F) transmitted to the front links (5A)(5B) and the pinions (7A)(7B) exceeds a predetermined or expected degree of the above-discussed stopper effect of left-side pinion (7A) as well as a predetermined or expected degree of braking effect of a brake unit provided with the motor (M), then it is possible that the left-side pinion (7A) may be rotated slightly downwards on and along the left-side front link's arcuate gear region (5Aa), which is however a very slight downward rotation that will not result in any undesired lowering of the seat (S).

In this context, the two front links (5A) (5B) may each be of a sector shape (i.e. a relatively narrow sector link) having an arcuate gear region to be meshed with the pinion (7A or 7B). But, to fully achieve the above-described effects, the illustrated shapes of the two front links (5A) (5B), each having the substantially semi-circular intermediate portion (5A-3 or 5B-3) defined between the upper and lower end portions (5A-2) (5A-1), are preferred, because an entire area of each of such front links (5A) (5B) is actually large as compared with a relatively narrow ordinary sector link, thus having a robust and wide configuration effective for dispersing a greater amount of the load (F) therein than the relatively narrow sector link. Also, the illustrated substantially L-shaped modes of two rear links (6A) (6B) are recommended, because such L-shaped rear links (6A) (6B) have their respective upper end portions (6A-2) (6B-2) which are oriented forwardly of the seat (S) and therefore effective in allowing a relatively large backward component of load (F) to be smoothly transmitted therefrom to the respective two connecting links (10A) (10B).

Further, the meshed engagement of the two arcuate gear regions (5Aa) (5Ba) with the respective two pinions (7A) (7B) and the disposition of two pinions (7A) (7B) on the side backwardly of the respective two front sector links (5A) (5B), in effect renders the two pinions (7A) (7B) themselves a stopper that serves to prevent downward displacement of both two front links (5A) (5B), while withstanding the excessive great load (F). Hence, a forward end portion of the seat cushion (SC) is retained substantially at a given level without being displaced downwardly in the case of rear-end collision. This is due to the fact that, when a rear-end collision occurs, an excessive great load (F) is applied to the seat (S) in the backward and downward direction, and in particular, the backward component of the load (F) is applied from the two front links (5A) (5B) directly to the two pinions (7A) (7B) at a large amount as compared with the downward component of the load (F), which strongly enhances the meshed engagement between the two pinions (7A) (7B) and the respective two gear regions (5Aa) (5Ba) of two front links (5A) (5B) to such an extent that both of the pinions (7A and 7B) and front links (5A and 5B) are not rotated in any direction. Thereby, both two lateral frame members' forward end portions (3A-1) (3B-1) are locked against downward displacement, so that the forward end portion of the seat cushion (SC) is not lowered and retained at a level substantially equal to the level where it has been positioned before the rear-end collision. In addition, such stable stopper effect obtained from the left- and right-side meshed engagements between the two front links (5A) (5B) and the two pinions (7A) (7B) insures to retain the seat cushion (SC) on a horizontal plane, without being inclined in any of leftwise and rightwise directions, which avoids lowering or downward inclination of one lateral side of the seat (S).

As indicated in FIG. 4, the right-side front link (5B) may be replaced by the illustrated substantially rectilinear front link (5C), and the right-side pinion (7B) may not be used. This replacement front link (5C) is shown as being at the upper end portion (5C-2) thereof pivotally connected via a pin (10*b*) with the forward end portion (10B-1) of the right-side connecting link (10B), while being at the lower end portion (5C-1) thereof pivotally connected via a pin (10*a*) with forward end portion (2B-1) of the upper rail (2B). Although not clearly shown, considering the previous descriptions, it is to be understood that the intermediate portion (5C-3) of that front link (5C) is welded fast on and about a right-side end portion of the front connecting shaft (8) in such a manner as to be free to rotate on the side of the right lateral frame member (3B), so that both left- and right-side front links (5B) (5C) are rotatable together synchronously relative to a central axis of the front connecting shaft (8). Since the actions of the front link (5C) are all similar to those of the other front links (5A and 5B), any further specific description on the front link (5C) is omitted for the sake of simplicity. But, it is important that such substantially rectilinear front link (5C) be formed properly from a suitable rigid material so as to have a rigidity equal or substantially equal to a rigidity of left-side front link (5A).

Accordingly, in accordance with the present invention, it is to be appreciated that a pair of known connecting links (10A) (10B) are simply provided between the known four movable links (5A, 5B, 6A and 6B), which such an arrangement that, irrespective of vertical rotation of those four links, one pivot point (at 10) of the left-side connecting link (10A) is always maintained at a location forwardly of and above the pinion (7A), while the other pivot point (at 10) of the right-side connecting link (10B) is always maintained at a location forwardly of and above the pinion (7B), and that one or both of the front links (5A) (5B) is/are simply of the substantially semi-circular or sector configuration having the arcuate gear region (5Aa and/or 5Ba). In other words, such simplified mechanical arrangement can be directly applied to the known seat lifter mechanism, which therefore makes it extremely easy to realize a robust construction to absorb an excessive great impact that may be caused in the case of rear-end collision and also prevent deformation of any one of those four links.

As such, the following advantageous effects are attained: (i) there is no need for increasing the thickness of each of the front and rear links (5A, 5B, 6A and 6B) for reinforcement to withstand the excessive great load (F); (ii) no special element or mechanism is required for preventing deformation of any one of the front and rear links (5A, 5B, 6A and 6B) in order to avoid lowering of the seat (S) which will be caused in the case of rear-end collision; and (iii) there is no need for increasing a height-wise dimension of both two lateral frame members (3A) (3B) in order to have a rigidity enough to withstand the excessive great load (F). This means that the seat (S) itself, can be made small in size and also made light in weight, and further, the number of required component parts are greatly reduced for a lowest possible costs involved in the assembly of the seat (S).

While having described the present invention thus far, it is to be understood that the invention is not limited to the illustrated embodiment, but any modification, addition and replacement may be applied thereto, without departing from the scopes of the appended claims. For example, with regard to a drive source for the drive pinion (7A), instead of the motor (M) an appropriate manual lever or manual rotating knob may be connected with the drive pinion (7A), in which case, a brake unit or gear reduction unit be incorporated in that manual lever or knob, so that the drive pinion (7A) will be locked against rotation every time the lever or knob is stopped at a given position.

What is claimed is:

1. A seat for use with a vehicle having a floor of therein, comprising:
    a seat cushion frame including a first lateral frame member and a second lateral frame member, wherein said first lateral frame member has a forward portion facing forwardly of the vehicle and a backward portion facing backwardly of the vehicle, whereas said second lateral frame member has a forward portion facing forwardly of the vehicle and a backward portion facing backwardly of the vehicle, a drive pinion rotatably provided to said first lateral frame member, said drive pinion being operatively connected with a drive source;

a first front link element so formed to have:
- a lower end portion configured to be pivotally secured on said floor;
- an upper end portion pivotally connected with said forward portion of said first lateral frame member; and
- an arcuate gear region integrally formed in the first front link element so as to be defined between said lower and upper end portions, said arcuate gear region being in a meshed engagement with said drive pinion and so arranged as to face backwardly of the seat;

said first front link element being movable vertically towards and away from said floor of vehicle;

said drive pinion being disposed backwardly of said first front link element;

a second front link element having: an upper portion including a pivotal connection point pivotally connected with said forward portion of said second lateral frame member; and a lower end portion configured to be pivotally secured on said floor;

a first rear link element having: an upper end portion pivotally connected with said backward portion of said first lateral frame member; and a lower end portion configured to be pivotally secured on said floor;

a second rear link element having: an upper end portion pivotally connected with said backward portion of said second lateral frame member; and a lower end portion configured to be pivotally secured on said floor;

a first connecting link element which is at the forward end portion thereof pivotally connected with said upper portion of said first front link element, while being at the backward end portion thereof pivotally connected with said upper end portion of said first rear link element; and a second connecting link element which is at the forward end portion thereof pivotally connected with said upper portion of said second front link element, while being at the backward end portion thereof pivotally connected with said upper end portion of said second rear link element, wherein operation of said drive source causes rotation of said drive pinion, which in turn causes vertical rotative displacement of said first and second front link elements as well as of said first and second rear link elements, thereby raising and lowering the seat, and wherein said forward end portion of said first connecting link element and said first front link element are arranged such that, even during said vertical rotative displacement of said first front link element, a pivotal connection point where said forward end portion of said first connecting link element is pivotally connected with said upper portion of said first front link element is maintained forwardly of a meshed engagement point where said drive pinion is in meshed engagement with said arcuate gear region of said first front link element.

2. The seat as claimed in claim 1, wherein said forward end portion of said first connecting link element and said first front link element are arranged such that said pivotal connection point therebetween is also maintained above said drive pinion, even during said vertical rotative displacement of said first front link element, said seat further comprising a connecting element rotatably extended between said first and second lateral frame members, and wherein said first front link element is at the pivotal connection point thereof fixedly connected with said connecting element and said second front link element is also at the pivotal connection point thereof fixedly connected with said connecting element, so that said first and second front link elements are at the respective upper portions thereof rotatable in synchronized way relative to said connecting element.

3. The seat as claimed in claim 1, wherein a free-to-rotate pinion is rotatably provided to said second lateral frame member, wherein said second front link element has a widened area defined in the upper portion thereof and an arcuate gear region defined in said widened area, said arcuate gear region being in a meshed engagement with said free-to-rotate pinion and so arranged as to face backwardly of the seat, wherein said free-to-rotate pinion is disposed backward of said arcuate gear region of said second front link element, while being in meshed engagement therewith, wherein said forward end portion of said second connecting link element and said second front link element are arranged such that, even during said vertical rotations of said second front link element, a pivotal connection point where said forward end portion of said second connecting link element is pivotally connected with said upper portion of said second front link element is maintained forwardly of a meshed engagement point where said free-to-rotate pinion is in meshed engagement with said arcuate gear region of said second front link element, and wherein said first link element is at the pivotal connection point thereof fixedly connected with said connecting element and said second front link element is also at the pivotal connection point thereof fixedly connected with said connecting element, so that said first and second front link elements are at the respective upper portions thereof rotatable, in synchronized way relative to said connecting element.

4. The seat as claimed in claim 3, wherein said forward end portion of said second connecting link element and said second front link element are arranged such that said pivotal connection point therebetween is also maintained above said drive pinion, even during said vertical rotative displacement of said second front link element.

* * * * *